United States Patent [19]

McArthur et al.

[11] Patent Number: 4,620,111
[45] Date of Patent: Oct. 28, 1986

[54] AUXILIARY PORTABLE POWER SUPPLY

[75] Inventors: William J. McArthur, Maple Grove; Glenn W. Merry, St. Paul, both of Minn.

[73] Assignee: Duracell Inc., Bethel, Conn.

[21] Appl. No.: 624,450

[22] Filed: Jun. 25, 1984

[51] Int. Cl.⁴ .............................................. H01M 2/00
[52] U.S. Cl. ..................... 307/150; 429/27; 429/97
[58] Field of Search ............... 307/61, 63, 54, 150; 429/27, 82, 83, 97, 101, 110, 150, 155, 156–159

[56] References Cited

U.S. PATENT DOCUMENTS 2,702,310  2/1955  Kaye et al. ........................... 136/111
4,380,576  4/1983  Yoshida et al. ........................ 429/27
4,493,880  1/1985  Lund .................................. 429/27 X Primary Examiner—A. D. Pellinen
Assistant Examiner—Derek S. Jennings
Attorney, Agent, or Firm—Ronald S. Cornell

[57] ABSTRACT

The present invention relates to a lightweight auxiliary power supply utilizing a plurality of button cells, preferably of the zinc air type. The present invention contemplates a housing member containing a plurality of wells, each adapted to receive one or more disc shaped button cells; switch means to control the flow of oxygen to the cells; and electrical connecting means to suitably connect the power supply to the battery operated device or appliance.

9 Claims, 5 Drawing Figures

AUXILIARY PORTABLE POWER SUPPLY

BACKGROUND OF THE INVENTION

Present invention relates to an auxiliary portable power supply device for use in conjunction with battery-powered appliances, particularly appliances such as lightweight radios and tape playing devices.

In recent times there has been a substantial increase in the number and type of battery operated portable devices. This is particularly true of small stereo radio/tape player devices of the type employing small lightweight headphones to facilitate use during exercise and sporting activities.

The use of such devices during exercise, jogging, bicycling and the like has required that the device be made as compact and as lightweight as possible, ideally so as to be attached to a belt or article of clothing without causing undue discomfort. Such size and weight limitations have therefore caused many of the devices to be designed to operate at 3 volts using two standard AA cells.

In the typical device two premium alkaline AA cells will provide approximately 12 hours of useful operating time. Attempts to design external auxiliary power sources for such devices have heretofore involved large cumbersome battery packs which often weighed as much as, or more than, the device being powered. They also constituted an additional unit to be separately clipped or attached to the belt or article of clothing.

DRAWINGS

SUMMARY OF INVENTION

Present invention provides a lightweight auxiliary power supply utilizing a plurality of button cells, preferably of the zinc air type. The present invention contemplates a housing member containing a plurality of wells, each adapted to receive one or more disk shaped button cells; switch means to control the flow of oxygen to the cells; and electrical connecting means to suitably connect the power supply to the battery operated device or appliance.

PREFERRED EMBODIMENT

While the present invention will be described with specific reference to particular preferred embodiments, it will be understood that these are only two of the preferred embodiments, and that the discussion and description are therefore by way of illustration and not by way of limitation.

Figure 1:
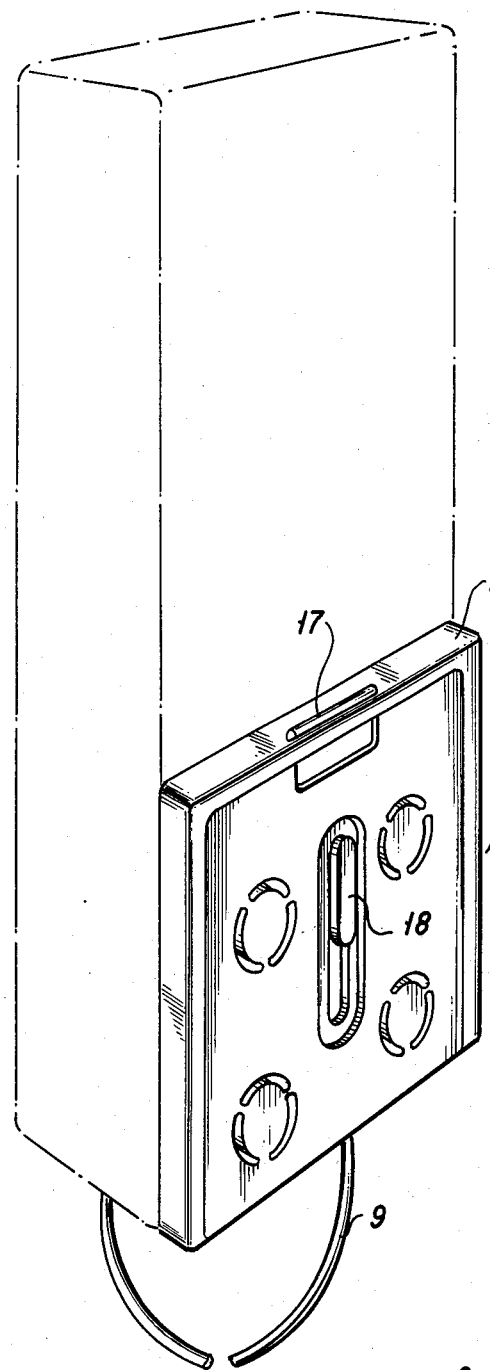
FIG. 1 is an isometric view of the power supply of the present invention attached to an appliance.

The preferred auxiliary portable power supply unit comprises a lightweight housing adapted to receive a plurality of zinc air type, disk shaped button cells to provide auxiliary current at 3 v and/or 6 v. FIG. 1 illustrates a device of the type contemplated by the present invention, generally designated as 1 attached to an appliance to be operated, shown in outline only. In the embodiment illustrated by FIG. 2, the main housing 2 has four wells 3, 4, 5, and 6, each adapted to receive a single button cell 13, 14, 15, and 16, a back plate 7, and a slideable switch means 8 disposed between said back plate and the exposed positive contacts surface of the button cells 13, 14, 15, and 16 having a projecting portion 18 adapted to fit within and project through aperture 28. Switch means 8 may be slideably moved forward or backward, by means of projection 18 such that when in the off position switch means 8 prevents air from passing through apertures 23, 24, 25, and 26 to button cells 13, 14, 15, and 16; while when in the on position it permits air to flow through apertures to said button cells. The unit also has connecting means 9 through which it can be electrically connected to an appliance.

Figure 2:
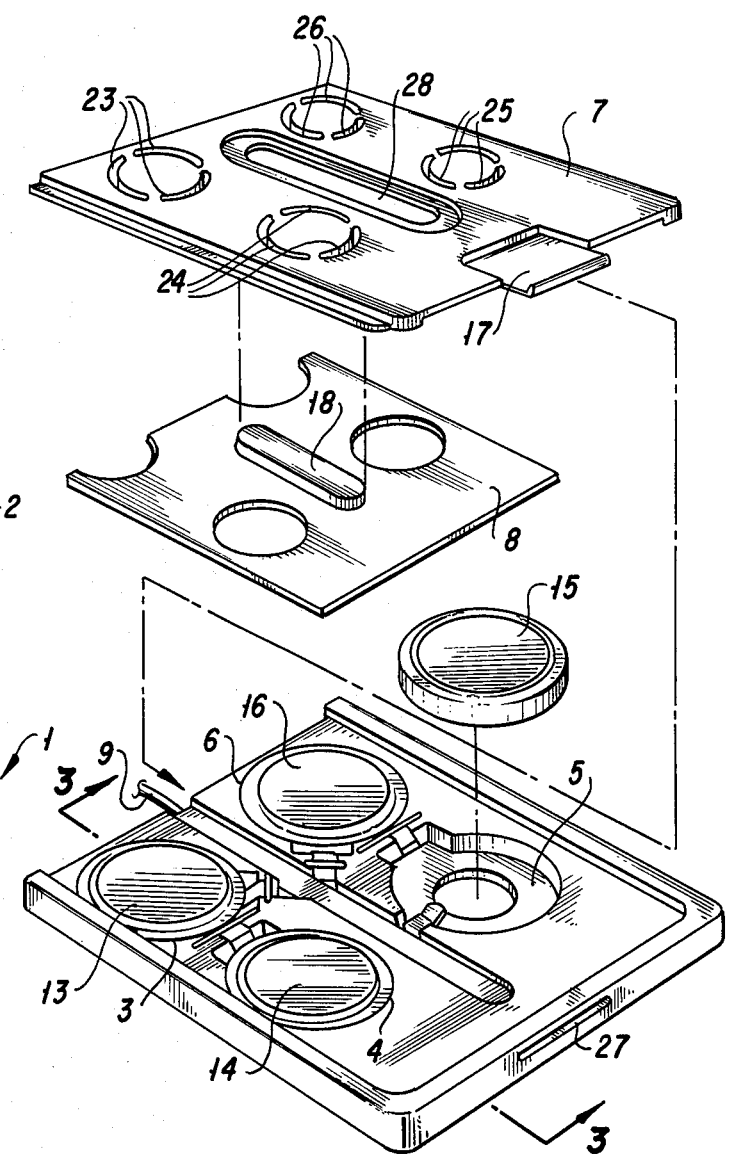
FIG. 2 is an exploded view of one of the preferred embodiments of the present invention.

As illustrated in FIG. 2, the preferred switch plate simply closes off the plurality of air holes in each of the button cells. Alternatively, the switch can function by shutting off access of oxygen to the interior of the power supply unit by sealing of apertures 23, 24, 25, and 26. This alternative embodiment may be less desirable, in that all of the oxygen present in the interior of the power supply device at the time it is turned off will still be available to the button cells, whereas the preferred switch plate would deny any further oxygen to the cells beyond that already actually inside the cell. Backplate 7 is secured in place by locking tab 17 which is adapted to pass through and releasably engage aperture 27 in housing 2.

Figure 3:
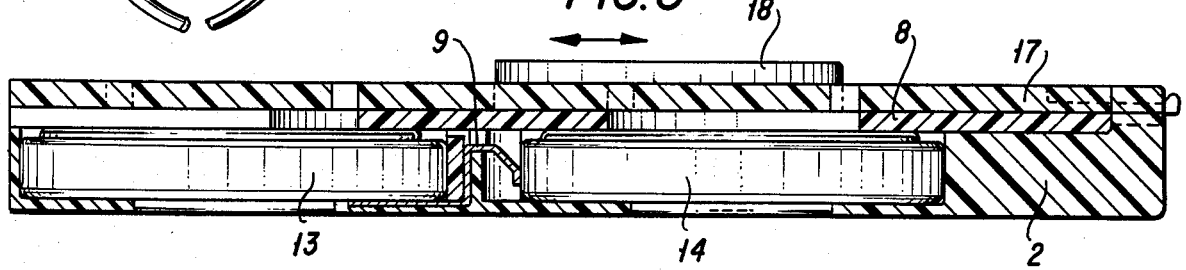
FIG. 3 is a cross-section of the device of FIG. 2 along the line 3—3.

In the embodiment illustrated in FIG. 2, cells 13 and 14, and cells 15 and 16, are connected in series and the two pairs of cells may be connected in parallel to produce 3 volts or in series to produce 6 volts. As shown in FIG. 3, cells 13 and 14 are electrically connected through contact means 9. Similar contact means, not shown, connect cell 15 to cell 16.

Figure 4:
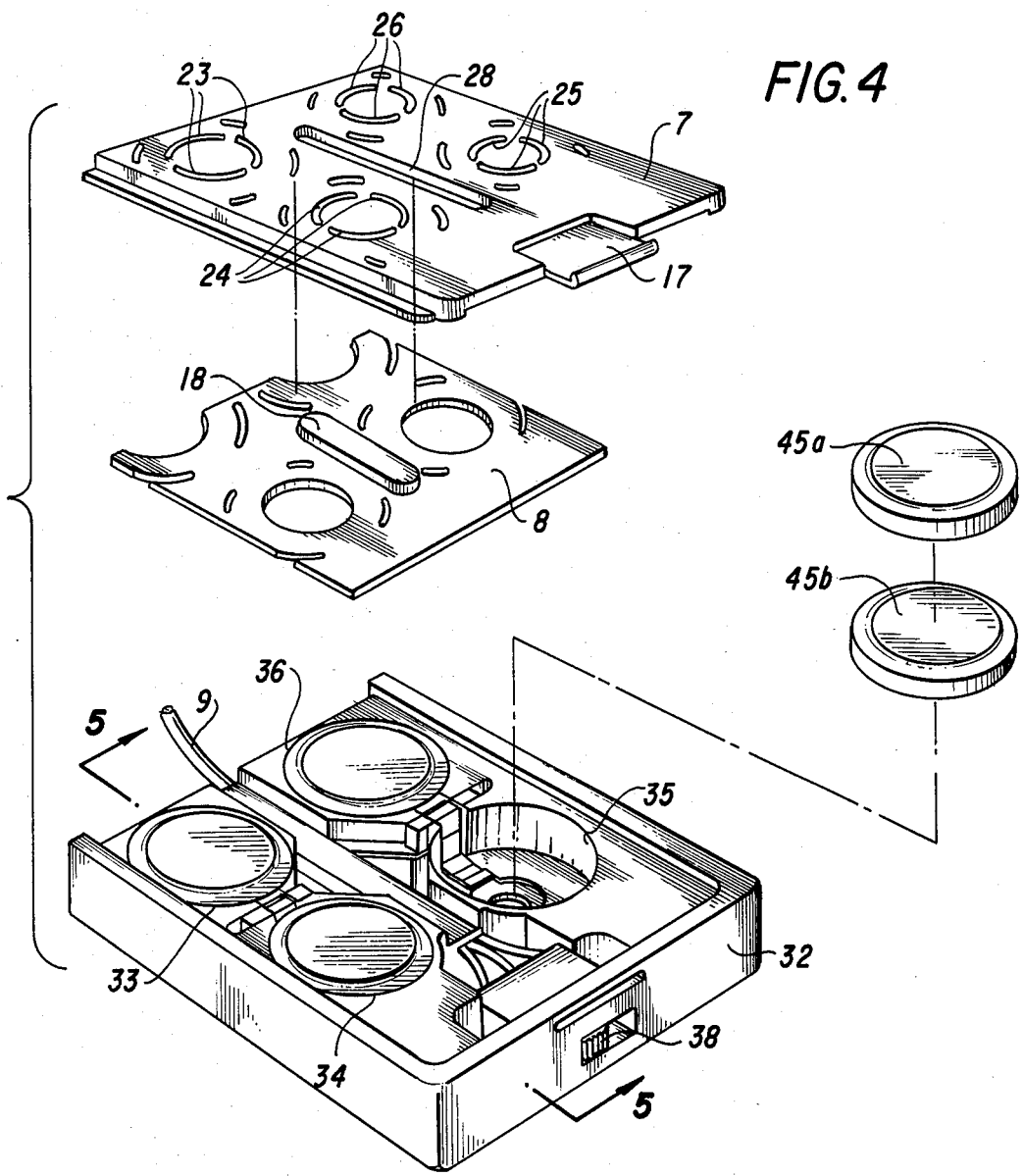
FIG. 4 is an alternate embodiment of the present invention.

In the embodiment illustrated by FIG. 4 the auxiliary power supply unit comprises a housing 32 having wells 33, 34, 35, and 36 each adapted to receive two zinc air button cells. Back plate 7, and switch means 8 of FIG. 3 are similar to back member 7 and switch means 8 of FIG. 2. The power supply device of FIG. 4 also has electrical switch means 39 suitably wired to provide power at 3 or 6 volts as desired.

Figure 5:
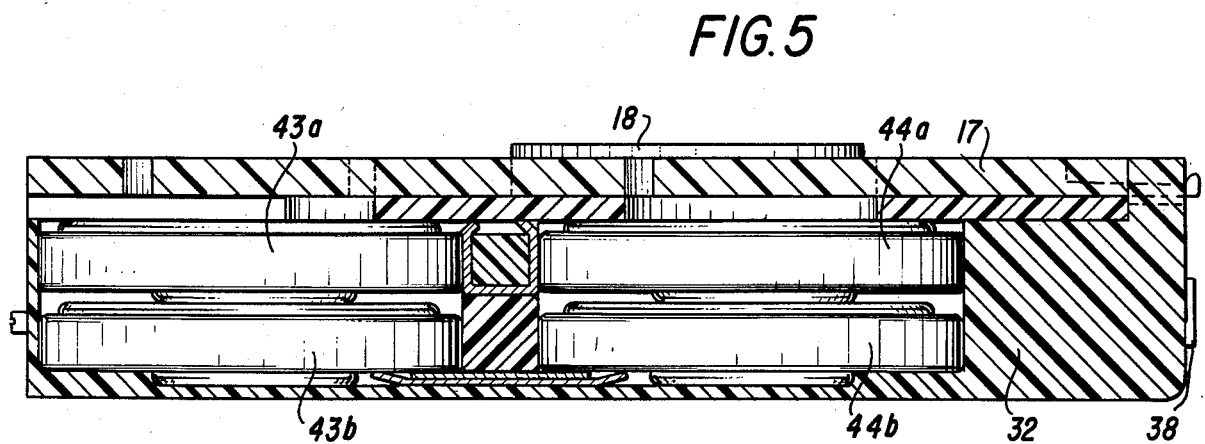
FIG. 5 is a cross section of the device of FIG. 4 along the line 5—5.

Button cells 43a, 43b, 44a, 44b, 45a, 45b, 46a, and 46b of FIGS. 4 and 5 are similar to the zinc air button cells employed in the device of FIG. 1. The respective a and b cells of each pair being connected in series so that the pair of cells in each of the wells will provide power at 3 volts. Positive contact means 37 is disposed to contact the positive can of button cells 43a and 44a, and negative contact means 38 is disposed to contact the negative can of button cells 43b and 44b. Similar contact means, not shown, connect cells 45a, 45b, 46a, and 46b. The respective pairs of wells are suitably connected to switch 39 through which all four pairs of cells may be connected in parallel to provide 3 volts, or two pairs may be connected in series to each other and then in parallel to the remaining two pairs of cells, so as to provide 6 volts.

The preferred button cell for use in the auxiliary portable power supply unit is a model 1200 HP type zinc air cell having a typical minimum open circuit voltage 1.45/1.35, a capacity of 2400 mAh and a weight of approximately 9.9 grams. Each cell has a maximum diameter of 30.48 mm and a thickness of approximately 5.1 mm.

Whereas the internal 3 volt power supply provided by two premium AA alkaline cells would have a useful life of approximately 12 hours, the four button cells of the device illustrated by FIG. 1 would provide 48 hours of useful life, and the eight cells of the device illustrated by FIG. 3 would provide over 96 hours. It should be noted that the limiting current capability of zinc air cells such as those employed with the device of the present invention is determined by the cathode area. For this reason the use of eight thin cells, as opposed to four thicker button cells, (in the embodiment illustrated in FIG. 3) will provide double the current capability because the eight cells will provide double the cathode area.

The device of the present invention may be attached to a belt or an article of clothing, however, the thinness and light weight of the power supply unit makes it particularly suitable to be attached directly to the outside of the appliance which it will power. This may be done by any suitable means, but the use of Velcro-type fastener devices is particularly advantageous.

Directly attaching the power supply unit to the appliance leaves the user with substantially a single element to be secured to his belt or clothing, the weight and thickness of the combination of appliance and auxiliary power unit being barely noticeably larger or heavier than the appliance by itself.

It will of course also be obvious that still other changes, modifications and alterations can be made in the apparatus and methods herein described without departing from the scope of the invention herein disclosed and it is our intention to be limited only by the appended claims.

As our invention we claim:

1. A lightweight auxiliary power supply apparatus comprising a housing member having a plurality of wells, each of said wells being adapted to receive at least one disk shaped zinc air button cell; switch means, connected to said housing, comprising a slideably mounted member, to control the flow of oxygen to each of the cells; and electrical connecting means, connected to said housing, to suitably connect said apparatus to a battery operated appliance.

2. The apparatus according to claim 1 wherein said switch means is a slideably mounted member which in an off position seals off entry of oxygen to the interior of the housing.

3. The apparatus according to claim 1 wherein said switch means is a slideably mounted member which in an off position engages and seals a plurality of air holes in each of the cells through which oxygen may otherwise pass into said cell.

4. The apparatus according to claim 3 wherein said apparatus is adapted to hold four cells each having a typical capacity of 2400 mAh.

5. The apparatus according to claim 3 wherein said apparatus is adapted to hold eight cells each having a typical capacity of 2400 mAh.

6. The apparatus according to claim 1 wherein said housing member has four walls, with two wells of one pair of adjacent said wells being electrically connected in series to each other, and the other two wells of the other pair of adjacent wells being similarly electrically connected it series to each other.

7. The apparatus according to claim 6 wherein said respective pairs of wells are electrically connected in parallel to each other.

8. The apparatus according to claim 6 wherein said respective pairs of wells are electrically connected in series to each other.

9. The apparatus according to claim 6 wherein said respective pairs of wells are each connected to an electrical switch means whereby they may be selectively connected in series or in parallel.

* * * * *